United States Patent
Rastogi et al.

(10) Patent No.: US 6,433,120 B1
(45) Date of Patent: Aug. 13, 2002

(54) METHOD FOR PROCESSING POLYETHYLENE HAVING A MOLECULAR WEIGHT OF AT LEAST 400,000 BY HEATING AT AN ELEVATED PRESSURE

(75) Inventors: Sanjay Rastogi, Eindhoven; Pieter Jan Lemstra, Veldhoven; Peter Paul Koets, Eindhoven, all of (NL)

(73) Assignee: Technische Universiteit Eindhoven, Eindhoven (NL)

( * ) Notice: Subject to any disclaimer, the term of this patent is extended or adjusted under 35 U.S.C. 154(b) by 0 days.

(21) Appl. No.: 09/367,282

(22) PCT Filed: Feb. 16, 1998

(86) PCT No.: PCT/NL98/00093

§ 371 (c)(1),
(2), (4) Date: Oct. 27, 1999

(87) PCT Pub. No.: WO98/35818

PCT Pub. Date: Aug. 20, 1998

(30) Foreign Application Priority Data

Feb. 17, 1997 (NL) ............................................. 1005294

(51) Int. Cl.$^7$ ............................................. C08F 110/02
(52) U.S. Cl. ..................... 526/352; 528/502; 528/503
(58) Field of Search .......................... 526/352; 528/502, 528/503

(56) References Cited

U.S. PATENT DOCUMENTS

| | | | |
|---|---|---|---|
| 4,587,163 A | | 5/1986 | Zachariades ................ 428/292 |
| 4,956,140 A | * | 9/1990 | Rolles et al. ................ 264/280 |
| 5,234,652 A | * | 8/1993 | Woodhams et al. ...... 264/210.2 |

FOREIGN PATENT DOCUMENTS

| | | |
|---|---|---|
| WO | 93/10953 | 6/1993 |
| WO | WO 93/10953 | 6/1993 |

OTHER PUBLICATIONS

S. Rastogi et al., "Role of Mobile Phases in the Crystallization of Polyethylene. 1. Metastability and Lateral Growth", Macromolecules, vol. 24, No. 24, pp. 6384–6391, (1991).

M.M. Shahin, et al., "Morphological Changes in Pressure Annealed Polyethylene", Journal of Materials Science, vol. 31, pp. 5541–5549, (1996).

M. Hikosaka et al., "Equilibrium Triple Point Pressure and Pressure–Temperature Phase Diagram of Polyethylene", Polymer, vol. 33, No. 12, pp. 2502–2507, (1992).

\* cited by examiner

Primary Examiner—David W. Wu
Assistant Examiner—William K Cheung
(74) Attorney, Agent, or Firm—Finnegan, Henderson, Farabow, Garrett, & Dunner, L.L.P.

(57) ABSTRACT

A method for processing ultra-high molecular weight polyethylene (UHMWPE) of at least 400,000 by heating under an elevated pressure, followed by cooling, wherein UHMWPE having a lamellar thickness <12 nm and a melting temperature at atmospheric pressure >141° C. is used, by carrying out the heating under an elevated pressure via a transient hexagonal phase, which phase is represented by the hatched area in the Figure, which lies below the equilibrium line of the phase transition orthorhombic phase—liquid phase, which area is enclosed by points $(P_1, T_1')$, $(P_2, T_1')$, $(P_2, T_2)$ and $(P_1, T_1)$, wherein $T_1$ and $T_2$ represent the equilibrium temperatures associated with pressures $P_1$ and $P_2$ respectively, followed by heating to melting and cooling to ambient temperature.

15 Claims, No Drawings

METHOD FOR PROCESSING POLYETHYLENE HAVING A MOLECULAR WEIGHT OF AT LEAST 400,000 BY HEATING AT AN ELEVATED PRESSURE

The present invention relates to a method for processing polyethylene having an ultra-high molecular weight (UHMWPE) of at least 400,000 by heating under an elevated pressure, followed by cooling, to UHMWIPE thus obtained and to a biomedical application of such UHMWPE.

Such a method for processing polyethylene having an ultra-high molecular weight (UHMWPE) of at least 400,000 is known from U.S. Pat. No. 4,587,163. Said method comprises the heating of powder UHMWPE or a similar partially fused, melt-crystallized material to a temperature of 220–320° C. in the absence of oxygen at a compression load of about 1500–2000 pounds (1 pound=0.454 kg) for about 10 minutes. Train the material is subjected to a compression load of about 12,000–14,000 pounds (1 pound =0.454 kg) at a temperature of about 150° C. for 10 minutes, after which the resulting material is cooled down to ambient temperature under a compression load of about 1500 pounds (1 pound= 0.454 kg), in order to obtain a semi-crystalline morphology, whereby the memory of the granular nature of the original starting material is no longer present. Although the compression value is precisely indicated, it is not clear which area unit applies when the pressure is indicated in force/area. Circumstances such as these cause the starting material to melt completely so as to form a homogeneous melt, in which the previous granular structure is no longer preserve. According to said US patent complete fusion of the powder particles of ultra-high molecular weight polyethylene takes place, as a result of which a uniform, melt-crystallized morphology is obtained upon heating to a temperature higher than 220° C. In addition to that it is known from said reference that only partial fusion of the powder particles takes place at temperatures lower than 220° C., which is caused by the high melting viscosity (in the temperature range of 145–210° C.), which hinders the formation of a molecular network between the powder particles. Furthermore, the high degree of physical entanglements hinders chain mobility during the compression moulding process; according to said US patent an effective chain interpenetration between powder particles can occur upon heating of the raw powder material or a partially fused melt-crystallized material to a temperature above 220° C., at which temperature the melt viscosity is significantly lower.

Experiments have shown that UHMWPE thus prepared, when used in artificial hip-joints, wherein a metal pin placed into the leg is provided with a layer of UHMWPE, which pin is present in the hollow space of the hip, exhibits so much wear after a period of use of about 7 years, that the metal pin must be surgically removed from the body in order to be replaced by a new pin. Such an operation after a relatively short period of use is undesirable. Moreover, in the future the number of artificial hip-joints being used will increase, which makes a longer period of use desirable.

The object of the present invention is, therefore, to provide polyethylene having an ultra-high molecular weight of at least 400,000, which material exhibits greater resistance to wear than the UHMWPE that is known from prior art.

Another object of the present invention is to provide a method for processing polyethylene having an ultra-high molecular weight of at least 400,000, which method is carried out under significantly lower temperature and pressure conditions than is known from prior art.

The method according to the present invention as referred to in the introduction is characterized in that UHMWPE having a lamellar thickness <12 nm and a melting temperature at atmospheric pressure >141° C. is used, wherein said heating at an elevated pressure takes place via a transient hexagonal phase, which phase is represented by the hatched area in the Figure, which lies below the equilibrium line of the phase transition orthorhombic phase-liquid phase, which area is enclosed by paints $(P_1, T_1')$, $(P_2, T_1')$, $(P_2, T_2)$ and $(P_1, T_1)$, wherein $T_1$ and $T_2$ represent the equilibrium temperatures associated with pressures $P_1$ and $P_2$ respectively, followed by heating to melting and cooling to ambient temperature.

The phase diagram of UHMWPE is generally subdivided into three separate phase areas, viz. an orthorhombic phase, a hexagonal phase and a liquid phase, and it is described in the article titled "Equilibrium triple point pressure and pressure-temperature phase diagram of polyethylene", Polymer, 1992, volume 33, issue 12, by Hikosaka, M., et al. The thermodynamically critical point $Q_U$ is associated with a pressure $Q_P$ of 3.5 kbar and a temperature $Q_T$ of 230° C., and for UHMWPE having a molecular weight of at least 400,000 it does not depend on the magnitude of the molecular weight. The transient hexagonal phase lies below the liquid phase-orthorhombic phase equilibrium line, as represented by the hatched part in the appended diagrammatic FIG. 1.

Such a method for processing UHMWPE is also known from European patent application No. 0 614 347, wherein polyethylene having an ultra-high molecular weight of at least 400,000, a crystalline melting point of greater than 144° C., and a crystal morphology comprising a bimodal distribution of the molecular chain fold spacings, wherein one group is dimensioned 200–800 nm, and another group is dimensioned 5–50 nm, is processed by subjecting polyethylene having an ultra-high molecular weight of at least 400,000 to a fluid under pressure of at least 2 kbar and a temperature of 190–300° C. for at least 0.5 hour, subsequently reducing the temperature to about 160–170° C. or lower, wherein the pressure is maintained at at least 2 kbar, and finally cooling to a temperature of about 130° C. or lower, and reducing the pressure to about 1 bar.

The method according to the present invention differs significantly from the method disclosed in European patent application No. 0 614 347, since heating at an elevated pressure is according to the present invention carried out via a transient hexagonal phase, which phase is achieved under lower pressure and temperature conditions than is the case with the hexagonal phase described in said European patent application. The processing of the starting material via the transient hexagonal phase in order to obtain a material which possesses satisfactory properties as regards resistance to wear is not known from said publication. In addition to this, the starting material of European patent application No. 0 614 347 differs significantly from that of the present application, since the present inventors use a special polyethylene having an ultra-high molecular weight, which polymer has a lamellar thickness of less than 12 nm and a melting temperature at atmospherical pressure >141° C., preferably a lamellar thickness of 5–12 nm and a melting temperature at atmospherical pressure of 141–148° C. Experiments have shown that if the lamellar thickness is more than 12 nm, there will be no complete fusion of the starting material. A corresponding effect is observed if the melting temperature is lower than 141° C., for example 140° C. The upper limit of the suitable melting temperature is determined by the UHMWPE that is used.

The experiments according to the present invention have shown the relation between the melting temperature at atmospheric pressure, the lamellar thickness and the method to be carried out for processing UHMWPE via the transient hexagonal phase so as to obtain UHMWPE which possesses better wear resistance properties than UHMWPE that has been processed according to methods which employ temperature and pressure conditions which are significantly higher than those employed in the present invention. The presence of such a transient hexagonal phase in the orthorhombic phase area constitutes an essential aspect of the method according to the present invention.

The present inventors explain this as follows, though it should be understood that they are by no means obliged to give such an explanation. It is assumed that the melting of the lamellar crystals having a lamellar thickness <12 nm takes place via a metastable transient hexagonal phase, which phase lies within the thermodynamically stable orthorhombic phase. After completion of the melting process and the recrystallisation from the melt, the appearance of a transient hexagonal phase is not observed anymore. During the heating and ageing of the samples that have crystallized in solution, the thickness of the lamellar crystals increases, in particular in the mobile hexagonal phase, and the appearance of a transient hexagonal phase can be related to the original, small lamellar thickness. The lamellar thickness of the starting material having an ultra-high molecular weight is essential for the present invention, therefore. Using polyethylene having an ultra-high molecular weight of at least 400,000 and a lamellar thickness <12 nm and a melting temperature at atmospheric pressure >141° C., which crystals are highly metastable, the transition from the orthorhombic phase to the transient hexagonal phase can take place at a pressure of around 1 kbar already, which pressure is significantly lower than the pressure mentioned in the prior art references.

The appended figure shows the phase diagram of polyethylene having an ultra-high molecular weight. Point Q, which is associated with a pressure $Q_P$ and a temperature $Q_T$, is the equilibrium point of the three phase transitions, viz the transition from orthorhombic phase to hexagonal phase, the transition from hexagonal phase to liquid phase, and the transition from orthorhombic phase to liquid phase. The present inventors have discovered that a transient hexagonal phase is present in the orthorhombic area, which transient hexagonal phase is represented by the hatched area, and which is defined by pressures $P_1$ and $P_2$ and temperatures $T_1'$, $T_1$, $T_2$.

The transient hexagonal phase is achieved by subjecting a special polyethylene having an ultra-high molecular weight to heating under an overpressure, which temperature and pressure limits are indicated by $T_1'$, $T_1$, $T_2$, $P_1$ and $P_2$ respectively in the phase diagram. The term special polyethylene having an ultra-high molecular weight is understood to mean ultra-high molecular weight polyethylene (Mw>400,000) having a lamellar thickness <12 nm, in particular in the range of 5–12 nm, and a melting temperature at atmospheric pressure >141° C., in particular in the range of 141–148° C. Although such a transient hexagonal phase is not sharply defined, it is present in the pressure range of 0.5 kbar ($P_1$)–3.4 kbar ($P_2$) and a temperature of at least 155° C. ($T_1'$). The values for $T_1$ and $T_2$ are determined by the equilibrium line of the phase transition liquid phase-orthorhombic phase, and amount to 160° C. ($T_1$) and 220° C. ($T_2$) respectively.

Heating from ambient temperature preferably takes place under an elevated pressure of at least 0.5 kbar, in particular preferably 0.8 kbar. If an elevated pressure of less than 0.5 kbar is used, processing cannot take place via the transient hexagonal phase, as a result of which the desired material properties cannot be obtained.

Heating from ambient temperature under an elevated pressure preferably takes place until at least 155° C., which value indicates the lower limit of the transient hexagonal phase. If a temperature of less than 155° C. is used, it will not be possible to process UHMWPE having an ultra-high molecular weight via the transient hexagonal phase.

At the moment the transient hexagonal phase is reached during heating under an elevated pressure, it is preferrer to reduce the heating-up speed so that a minimum residence time in the transient hexagonal phase is obtained, in order to effect substantially complete fusion of the UHMWPE particles. If complete fusion of the UHMWPE particles in the transient hexagonal phase is not achieved, the UHMWPE that is obtained will not possess sufficient resistance to wear. Moreover, the heating-up speed from ambient temperature to the transient hexagonal phase must be higher than the heating-up speed that is employed once the transient hexagonal phase has been reached. If a low heating-up speed is employed until the transient hexagonal phase is reached, the UHMWPE crystals will tend to take on a greater lamellar thickness, which involves the risk of a lamellar thickness in excess of 12 nm being obtained, as a result of which processing via the transient hexagonal phase can no longer take place.

Once the transient hexagonal phase is reached, heating under an elevated pressure will be continued to a temperature above the melting temperature, which temperature lies above the orthorhombic phase-liquid phase equilibrium line as represented in the figure of the appended phase diagram. Once the starting material has melted, the aggregate is cooled. Said cooling may or may not take place under an elevated pressure, preferably under atmospheric pressure.

Experiments have shown that heating to above said melting temperature may be followed by cooling to ambient temperature, which may or may not take place under an elevated pressure. If said cooling to atmospheric pressure takes place under atmospheric pressure, the pressure within the system will be removed once the desired melting temperature has been reached, after which cooling will take place. It should be understood, however, that the heating of UHMWPE must take place at an overpressure of at least 0.5 kbar. Preferably said heating is carried out under isobaric conditions, but a slight pressure increase of about 200 bar is allowable, whilst a pressure decrease of about 200 bar during heating under isobaric conditions will result in a product which has undesirable mechanical properties.

The present invention furthermore relates to the medical application of the UHMWPE obtained in accordance with the present method. The term biomedical application is understood to mean application in the human body, for example tendons, in particular Achilles tendons, kneecaps, hip-joints and applications wherein a combination of biomedical compatibility, strength and resistance to wear is required, as is for example the case with intervertebral discs.

Other applications, wherein the homogeneity of the morphologies obtained in accordance with the present invention is important, are the production gf industrial components having a high resistance to wear, such as bearings, gears, packings, conveyor belt components and other industrial components which are currently made of a metal. Also pipe linings, in particular inner jacket linings and bottom layers for skis can be mentioned as suitable industrial applications.

The present invention will be explained in more detail hereafter by means of examples, whereby it should be noted that the present invention is by no means limited to special examples such as the ones below.

EXAMPLE 1

Polyethylene having a molecular weight 500,000 (Hostalen GUR 4130, marketed by Hoechst), an average lamellar thickness or 8 nm and a melting temperature at atmospheric pressure of 145° C. was subjected to an overpressure of 0.8 kbar at a temperature of 25° C. Then the temperature was increased to 150° C. under isobaric conditions, at a heating up speed of 8° C./min. Heating from 150° C. 200° C. was carried out under the same pressure at a heating-up speed of 1° C./min. At 200° C. the starting material was completely molten. The sample was cooled down from 200° C. to room temperature at a pressure of 0.8 kbar and a cooling-down speed of 10° C./min. At room temperature the pressure was reduced to atmospheric conditions, and the sample was removed from the pressure cell. An electron micrograph showed that complete fusion of the polymer crystals had taken place.

EXAMPLE 2

Polyethylene having a molecular weight of 500,000 (Hostalen GUR 4130, marketed by Hoechst), a lamellar thickness of 9 nm and a melting temperature at atmospheric pressure of 145° C. was to the same treatment as in Example 1, with this exception that other temperature and pressure conditions were employed. The pressure was set at 1.2 kbar, and the temperature was increased to 160° C. under isobaric conditions, at a heating-up speed of 8° C./min, followed by further heating to 220° C. at a heating-up speed of 1° C./min. At 220° C. the starting material appeared to be completely molten. The sample was subsequently cooled down to room temperature at a cooling-down speed of 10° C./min, whereby the pressure was maintained. At room temperature the pressure was reduced to atmospheric conditions, and the sample was removed from the pressure cell. An electron micrograph showed that the material thus prepared exhibited complete fusion of the particles.

EXAMPLE 3

Polyethylene having a molecular weight of 500,000 (Hostalen GUR 4130, marketed by Hoechst), a lamellar thickness of 9 nm and a melting temperature at atmospheric pressure of 145° C. was subjected to the same treatment as in Example 1, with this exception that the temperature and pressure conditions were changed. At room temperature the pressure was increased to 2.0 kbar, after which the sample was heated to 170° C. under isobaric conditions, at a heating-up speed of 8° C./min, followed by further, heating to 225° C. at a heating-up speed of 1° C./min. At 225° C. the starting material appeared to be completely molten. Once the desired temperature had been reached, the aggregate was cooled under pressure to room temperature, and the pressure was removed from the system at this temperature. An electron micrograph showed that the polyethylene thus prepared possessed a semicrystalline morphology, whereby complete fusion of the particles has taken place.

EXAMPLE 4

The treatment of in Example 1 was repeated, with this exception that cooling to room temperature took place under atmospheric conditions. An electron micrograph showed that the polyethylene particles did not exhibit separate areas.

EXAMPLE 5

The treatment of Example 1 was repeated with this exception that the pressure during heating and cooling was 1.4 kbar. The polyethylene thus prepared corresponded with the polyethylene prepared in example 1.

Comparative Example 1

The same temperature and pressure conditions as in Example 1 were used, with this exception that the polethylene having a molecular weight of 500,000, a lamellar thickness of 11 nm and a melting temperature at atmospheric pressure of 140° C. was used. The electron micrograph showed that no complete fusion of the original polyethylene particles had taken place. This comparative example shows that a polyethylene having a melting temperature; at atmospheric pressure of less than 141° C. leads to an end product which has unndesirable mechanical properties.

Comparative Example 2

The same temperature and pressure conditions as in Example 1 were used, with this exception that polyethylene having a molecular weight of 500,000, a lamellar thickness of 13 nm and a melting temperature at atmospheric pressure of 142° C. was used. An electron, micrograph showed the same result as obtained in Comparative Example 1. The results of Comparative Example 2 show that a polyethylene having a lamellar thickness of 13 nm leads to an end product which has undesirable mechanical properties.

Comparative Example 3

Polyethylene having a molecular weight 500,000 (Hostalen GUR 4130, marketed by Hoechst), an average lamellar thickness of 8 nm and a melting temperature at atmospheric pressure of 145° C. was subjected to an overpressure of 0.8 kbar at a temperature of 25° C. Then he temperature was increased to 200° C. under isobaric conditions at a heating-up speed of 1° C./min. Once this temperature had been reached, cooling to room temperature under pressure took place at a cooling down speed of 10° C./min. At room temperature the pressure was reduced to 6 atmospheric conditions, and the sample was removed from the pressure cell An electron micrograph showed that no complete fusion of the polymer crystals had taken place. The slow heating-up speed durirg the entire process leads to an increase in the lamellar thickness of UHMWPE crystals to a value >12 nm, as a result of which no processing via the transient hexagonal phase has taken peace.

Comparative Example 4

The same starting material as used in Comparative Example 3 was subjected to an overpressure of 0.8 kbar from ambient temperature. Then the temperature was increased to 200° C. under isobaric conditions, at a heating-up speed of 8° C./min. Once this temperature had been reached, the sample was further treated as described in Comparative Example 3. An electron micrograph showed that no complete fusion of the polymer crystals had taken place. The present inventors ascribe this incomplete fusion to the fact that the residence time in the transient hexagonal phase is too short.

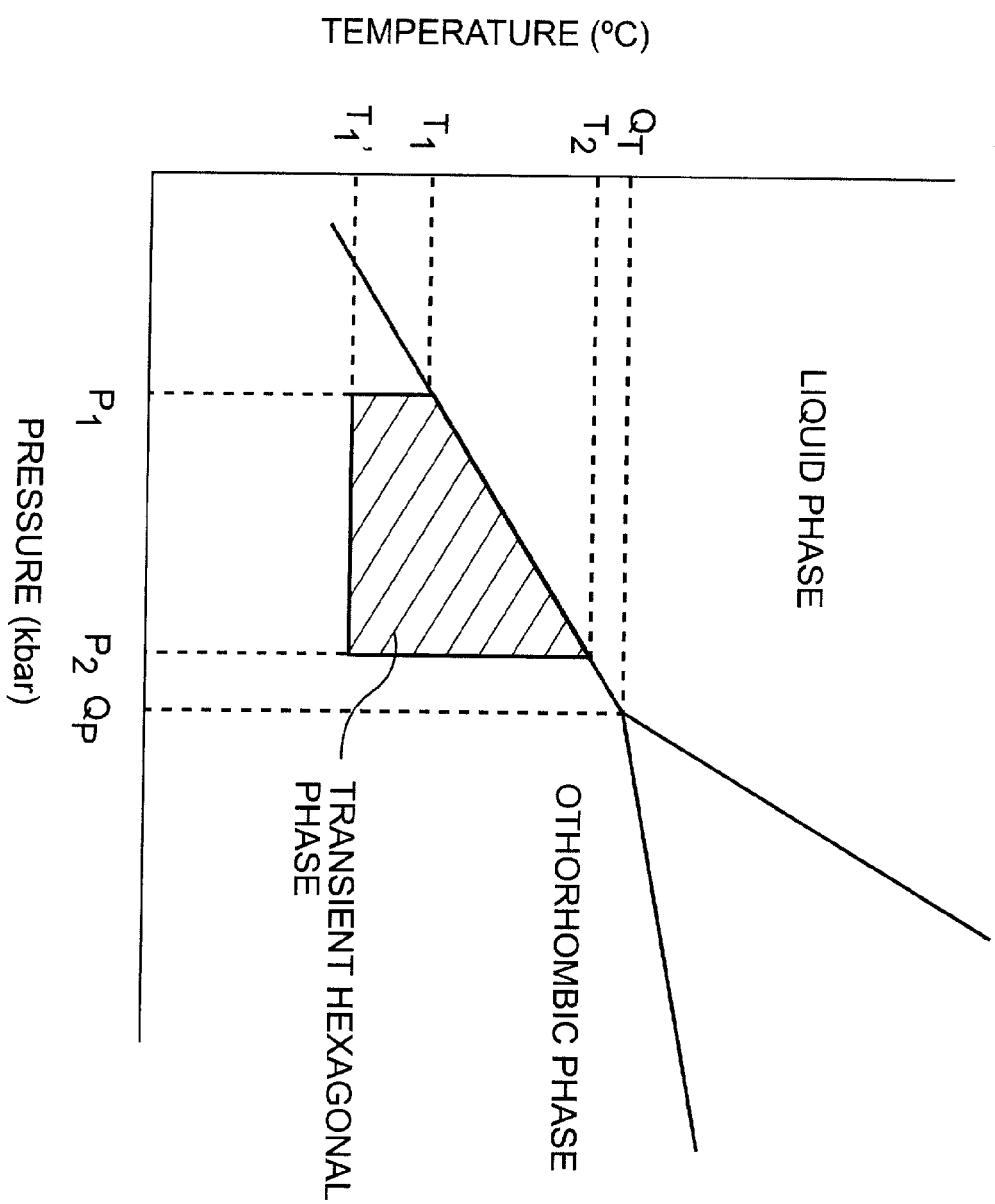

What is claimed is:

1. In a method for processing ultra-high molecular weight polyethylene (UHMWPE) having a molecular weight (Mw) of at least 400,000 by heating under elevated pressure, followed by cooling, the improvement which comprises the a. providing particles of said UHMWPE having a lamellar thickness of <12 nm and a melting temperature at atmospheric pressure >141° C.;
b. heating said particles from ambient temperature under an elevated pressure of at least 0.5 kbar in a pressure cell via a transient hexagonal phase in a static condition, which phase occurs below the equilibrium triple point on the UHMWPE-phase diagram, wherein said triple point is defined by the intersection between the equilibrium phase transition lines for orthorhombic to liquid, orthorhombic to hexagonal, and hexagonal to liquid phase transitions to effect substantially complete fusion of the particles;
c. continuing the heating of the resulting UHMWPE under an elevated pressure to at least the melting temperature of the UHMWPE;
d. cooling the resulting melted UHMWPE product to ambient temperature; and
e. removing the cooled product from the pressure cell.

2. The method according to claim 1, wherein the heating steps are conducted under substantially isobaric conditions.

3. The method according to claim 1, wherein the heating of step (b) takes place at two heating-up speeds, including a first heating-up speed before entering the hexagonal phase, and a second heating-up speed less than the first heating-up speed after entering the hexagonal phase, to obtain a residence time in the hexagonal phase which effects substantially complete fusion of the UHMWPE particles.

4. The method according to claim 1, wherein said heating from ambient temperature takes place under an elevated pressure of at least 0.5 kbar.

5. The method according to claim 1, wherein said heating from ambient temperature takes place under an elevated pressure of at least 0.8 kbar.

6. The method according to claim 1, wherein the HMWPE is heated under an elevated pressure from ambient temperature to a temperature of at least 155° C.

7. The method according to claim 1, wherein said heating under an elevated pressure is continued until the temperature exceeds the melting temperature, after which cooling takes place.

8. The method according to claim 1, wherein said cooling takes place under atmospheric pressure.

9. The method according to claim 1, wherein the UHMWPE has a melting temperature at atmospheric pressure ranging from 141–148° C.

10. The method according to claim 1, wherein the UHMWPE has a lamellar thickness ranging from 5–12 nm.

11. The method according to claim 1, wherein the heating in step (b) is conducted at a maximum heating-up speed of 20° C./min. until the transient hexagonal phase is reached.

12. The method according to claim 11 wherein the speed is 5–10° C./min.

13. The method according to claim 1, wherein the speed of heating in step (c) is 0.5–5° C./min. once the transient hexagonal phase has been reached.

14. UHMWPE obtained according to the method of claim 1.

15. A biomedical device of UHMWPE, comprising the UHMWPE of claim 14.

* * * * *

UNITED STATES PATENT AND TRADEMARK OFFICE
CERTIFICATE OF CORRECTION

PATENT NO.     : 6,433,120 B1
DATED          : August 13, 2002
INVENTOR(S)    : Sanjay Rastogi et al.

It is certified that error appears in the above-identified patent and that said Letters Patent is hereby corrected as shown below:

Drawings,
Please include the attached figure in the patent.

Signed and Sealed this

Eleventh Day of February, 2003

JAMES E. ROGAN
*Director of the United States Patent and Trademark Office*